United States Patent
Frey et al.

(10) Patent No.: US 6,595,069 B2
(45) Date of Patent: Jul. 22, 2003

(54) ELECTROMAGNETIC FLOW SENSOR INCLUDING INSULATING MATERIAL AND EMBEDDED REINFORCING BODY

(75) Inventors: Daniel Frey, Liestal (CH); Antonio Magliocca, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 09/995,485

(22) Filed: Nov. 28, 2001

(65) Prior Publication Data

US 2002/0033054 A1 Mar. 21, 2002

Related U.S. Application Data (62) Division of application No. 09/524,114, filed on Mar. 13, 2000.
(60) Provisional application No. 60/139,409, filed on Jun. 16, 1999.

(30) Foreign Application Priority Data

Mar. 26, 1999 (EP) .............................. 99105159

(51) Int. Cl.[7] ................................. G01F 1/58
(52) U.S. Cl. ................................. 73/861.11
(58) Field of Search ................ 73/861.08, 861.11, 73/861.12, 861.13

(56) References Cited

U.S. PATENT DOCUMENTS

| 3,213,685 A | | 10/1965 | Mannherz et al. | |
|---|---|---|---|---|
| 4,186,600 A | * | 2/1980 | Appel et al. | 73/861.12 |
| 4,214,477 A | | 7/1980 | Schmoock | |
| 4,281,552 A | * | 8/1981 | Nissen et al. | 73/861.12 |
| 4,403,933 A | | 9/1983 | Davis et al. | |
| 4,454,766 A | | 6/1984 | Reinhold et al. | |
| 4,470,309 A | * | 9/1984 | Wada | 73/861.12 |
| 4,592,886 A | | 6/1986 | Mannherz | |
| 4,804,207 A | | 2/1989 | Berchem et al. | |
| 5,280,727 A | * | 1/1994 | Hafner et al. | 73/861.11 |

FOREIGN PATENT DOCUMENTS

| EP | A 36 513 | 3/1981 |
|---|---|---|
| EP | A 581 017 | 6/1993 |
| GB | 2 118 477 | 11/1983 |

* cited by examiner

Primary Examiner—Harshad Patel
Assistant Examiner—Takisha S Miller
(74) Attorney, Agent, or Firm—Bose McKinney & Evans LLP (57) ABSTRACT

An electromagnetic flow sensor for a fluid flowing through a pipe comprises a measuring tube which can be inserted into a pipe. The measuring tube comprises a support tube as an outer covering of the measuring tube, a tubular liner of insulating material, located in a lumen of the support tube, for conducting the flowing fluid isolated from the support tube, and an open-pore reinforcing body for stabilizing the liner. The reinforcing body is sintered directly in said support tube. A magnetic-circuit arrangement is disposed on the measuring tube for producing and guiding a magnetic field which induces an electric field in the flowing fluid. Electrodes pick up voltages from the electric field. Furthermore, the reinforcing body has coil-core seats for coil cores of the magnetic-circuit arrangement.

13 Claims, 5 Drawing Sheets

ELECTROMAGNETIC FLOW SENSOR INCLUDING INSULATING MATERIAL AND EMBEDDED REINFORCING BODY

This is a division of U.S. application Ser. No. 09/524,114, filed Mar. 13, 2000, which claims the benefit of U.S. Provisional Application Serial No. 60/139,409, filed Jun. 16, 1999. U.S. application Ser. No. 09/524,114 is incorporated herein by reference for all purposes.

FIELD OF THE INVENTION

This invention relates to a method of Manufacturing an electromagnetic flow sensor and to flow sensors which can be manufactured by such a method.

BACKGROUND OF THE INVENTION

As is well known, electromagnetic flow sensors can measure the volumetric flow rate of an electrically conductive fluid flowing through a measuring tube of the flow sensor. A magnetic-circuit arrangement coupled to excitation electronics produces a magnetic field of maximum density which passes through the fluid within a measurement volume in sections, particularly in the area with high flow velocity, at right angles to the direction of fluid flow, and which closes essentially outside the fluid. The measuring tube is therefore made of nonferromagnetic material, so that the magnetic field will not be adversely affected during measurements.

Due to the movement of the charge carriers of the fluid in the magnetic field, according to the magnetohydrodynamic principle an electric field of a given strength is produced at right angles to the magnetic field and to the direction of fluid flow. By two electrodes spaced in the direction of the electric field and by evaluation electronics connected to these electrodes, a voltage induced in the fluid can thus be measured. This voltage is a measure of the volumetric flow rate. To pick off the induced voltage, use is made of either galvanic electrodes which are in contact with the fluid, or capacitive electrodes, which do not contact the fluid.

The flow sensor is so designed that the induced electric field closes outside the fluid practically only via the evaluation electronics connected to the electrodes. To guide and effectively couple the magnetic field into the measurement volume, the magnetic-circuit arrangement commonly comprises two coil cores which are disposed at a distance from each other, particularly diametrically opposite each other, along a circumference of the measuring tube, and have respective free end faces located opposite each other, particularly mirror-symmetrically with respect to each other.

By means of a coil assembly connected to the excitation electronics, the magnetic field is coupled into the coil cores in such a way as to pass through the fluid flowing between the two end faces, at least in sections, at right angles to the direction of flow.

Because of the high mechanical stability required for such measuring tubes, the latter preferably consist of an external support tube of a predeterminable strength and width, particularly of a metallic support tube, whose inner surface is covered with an insulating material of predeterminable thickness, the so-called liner.

U.S. Pat. No. 3,213,685 discloses an electromagnetic flow sensor comprising:

a measuring tube having an inlet-side first end and an outlet-side second end which can be inserted into a pipe in a pressure-tight manner and comprises:

a nonferromagnetic support tube as an outer covering of the measuring tube,
  a tubular liner located in a lumen of the support tube and made of an insulating material for conducting a flowing fluid isolated from the support tube, and
  a reinforcing body embedded in the liner for stabilizing the latter;
  a magnetic-circuit arrangement disposed at the measuring tube for producing and guiding a magnetic field which induces an electric field in the flowing fluid; and
  a first electrode and a second electrode for picking up a voltage from the electric field.

The liner serves to chemically isolate the support tube from the fluid. In the case of support tubes of high electric conductivity, particularly in the case of metallic support tubes, the liner also serves to provide electric isolation between the support tube and the fluid in order to prevent the electric field from being short-circuited via the support tube.

Thus, by a suitable design of the support tube, the strength of the measuring tube can be adapted to the mechanical stresses exerted in the respective application, while by the liner, the measuring tube can be adapted to meet the chemical, and particularly hygienic, requirements in force for the respective application.

The liner, which is formed of plastic, is commonly made with an open-pore reinforcing body completely embedded therein, particularly a metallic reinforcing body. This reinforcing body serves to stabilize the liner mechanically, particularly against pressure changes and thermally induced variations of volume. JP-Y 53-51 181, for example, shows a tubular reinforcing body whose wall is provided with holes for receiving the liner material. This reinforcing body is located in and is coaxial with a support tube, and is completely surrounded by insulating material.

To optimize the density of the magnetic field and thus improve the sensitivity of the flow sensor, the end faces of the coil cores are designed as pole pieces with as large an area as possible and a given curvature. By shaping this curvature in a suitable manner, the density of the magnetic field in the measurement volume can be selectively-optimized. This also optimizes the three-dimensional shape of the electric field and, thus, the dependence of the voltage induced in the fluid on the flow velocity of the fluid.

The three-dimensional shape of the magnetic field in the fluid and, thus, the accuracy of the flow sensor, besides depending on the form of the two end faces, are also determined by the distance between the two end faces. The farther the two end faces are apart, the weaker the electric field and the higher the sensitivity of the measured voltage to disturbances, such as changes in flow behavior or temperature variations in the fluid.

Therefore, to improve the accuracy of the flow sensor, on the one hand, the end faces should be spaced a minimum distance apart and, on the other hand, their curvature should be adapted to the respective optimum curvature as accurately as possible. In commercially available flow sensors, therefore, the pole pieces are shaped essentially according to the outer contour of the tube and are so disposed on the measuring tube that their end faces rest directly on the liner; see, for example, U.S. Pat. No. 4,825,703.

U.S. Pat. No. 5,664,315 discloses a method of manufacturing a measuring tube of an electromagnetic flow sensor whose inner surface is provided with a liner. Prior to the introduction of the liner into the support tube, an expanded-metal lattice which mechanically stabilizes the liner is fitted as a prefabricated reinforcing body. The liner is introduced by filling a liquefied insulating material into the measuring tube and allowing it to solidify. After having solidified, the insulating material surrounds the reinforcing body and thus forms the liner. The liner is preferably formed using injection-molding or transfer-molding techniques.

It is also common practice to install a completely prefabricated liner in the support tube. JP-A 59-137 822, for example, shows a method in which the liner is formed by softening an external plastic film and an internal plastic film surrounding a tubular, porous reinforcing body of high-grade steel.

SUMMARY OF THE INVENTION

It has been found that, on the one hand, liners of the above kind have a very high mechanical long-term stability, even in temperature ranges of −40° C. to 200° C. with corresponding jumps in temperature, but that, on the other hand, the introduction of a separately produced reinforcing body into, and its fixing in, the support tube are very costly and complicated steps in the manufacturing process. The cost and complication increase with increasing requirements placed on the accuracy of fit of the reinforcing body in the support tube.

It has also been found that with the coil cores disposed on the liner, particularly at a great ratio of the width of the support tube to the width of the reinforcing body for the liner and at low flow velocities of the fluid, increased measurement errors may occur.

It is therefore an object of the invention to provide a method of producing a liner of an electromagnetic flow sensor with a reinforcing body embedded therein which reduces the cost and complexity of the manufacturing process.

Another object of the invention is to provide an electromagnetic flow sensor in which arbitrarily shaped coil cores, particularly coil cores with curved end faces, each have one end positively fitted in the reinforcing body of the liner with a predeterminable depth.

To attain the first-mentioned object, the invention provides a method of manufacturing a measuring tube for an electromagnetic flow sensor, said measuring tube having an inlet-side first open end and an outlet-side second open end and comprising:
  a nonferromagnetic support tube;
  a tubular liner located in a lumen of the support tube and made of an insulating material; and
  an open-pore reinforcing body embedded in the liner, said method comprising the steps of:
  prefabricating the support tube;
  forming a first sintering space in the lumen of the support tube by
    inserting a first sintering mandrel with a smallest diameter greater than the smallest inside diameter of the liner into the lumen of the support tube and temporarily fixing it therein, and
    closing the support tube in a sinter-tight manner, leaving at least one first filling aperture for a granular first material to be sintered;
  forming the reinforcing body directly in the lumen of the support tube in such a manner that it fits said lumen, by
    introducing the first material to be sintered into the first sintering space,
    sintering the first material in the sintering space, and removing the first sintering mandrel;
  forming a casting space in the lumen of the support tube by
    temporarily fixing a casting mandrel having a smallest diameter not exceeding the smallest diameter of the liner in the lumen of the support tube, and
    closing the support tube in a cast-tight manner, leaving at least one casting aperture for a liquefied insulating material; and
  forming the liner directly in the lumen of the support tube by
    introducing the liquefied insulating material into the casting space,
    allowing the liquefied insulating material to penetrate into the reinforcing body, and
    allowing the liquefied insulating material to solidify in the lumen of the support tube.

Furthermore, the invention provides an electromagnetic flow sensor comprising:
  a measuring tube which can be inserted into a pipe in a pressure-tight manner and has an inlet-side first end and an outlet-side second end, and which contains
    a nonferromagnetic support tube as an outer covering of the measuring tube,
    a tubular liner of insulating material, located in a lumen of the support tube, for conducting a flowing fluid isolated from the support tube, and
    an open-pore reinforcing body embedded in the liner for stabilizing the liner;
  a magnetic-circuit arrangement disposed on the measuring tube for producing and guiding a magnetic field which induces an electric field in the flowing fluid, said magnetic-circuit arrangement comprising
    a first coil,
    a second coil,
    a ferromagnetic first coil core magnetically coupled to the coils and having a first end face curved at least in sections, and
    a ferromagnetic second coil core magnetically coupled to the coils and having a second end face curved at least in sections; and
  a first electrode and a second electrode for picking up a voltage from the electric field,
  the first coil core having a first end section inserted through a first wall opening of the support tube and fitted in a first coil-core seat of the reinforcing body in such a manner that the first end face is in positive contact with a first surface of the coil-core seat, and
  the second coil core having a second end section inserted through a second wall opening of the support tube and fitted in a second coil-core seat of the reinforcing body in such a manner that the second end face is in positive contact with a second surface of the coil-core seat.

A first embodiment of the method of the invention comprises the steps of:
  inserting, after the sintering of the reinforcing body and prior to the insertion of the first casting mandrel, a second sintering mandrel having a smallest diameter greater than the smallest inside diameter of the liner into the lumen of the support tube and temporarily fixing it therein in such a way as to form a second sintering space;
  closing the support tube in a sinter-tight manner, leaving at least one filling aperture for a granular, second material to be sintered;
  introducing the second material to be sintered into the second sintering space;
  sintering the second material and thus enlarging the reinforcing body in the lumen of the support tube at least in sections; and replacing the second sintering mandrel by the first casting mandrel.

A second embodiment of the method of the invention comprises the steps of:
forming, prior to the insertion of the first sintering mandrel,
a first expanded portion in the inlet-side first end of the support tube and
a second expanded portion in the outlet-side secondend of the support tube; and
before introducing in the first material to be sintered, closing the support tube in such a manner that after the sintering, the reinforcing body fills the first and second expanded portions at least in part.

In a third embodiment of the method of the invention, the first and second expanded portions are tapered toward the inside.

A fourth embodiment of the method of the invention comprises the steps of:
providing the support tube, prior to the insertion of the first sintering mandrel,
with a first wall opening for the insertion of a ferromagnetic first coil core having a first end face, and
with a second wall opening for the insertion of a ferromagnetic second coil core having a second end face; and
prior to the introduction of the first material to be sintered into the first sintering space, closing the first wall opening and the second wall opening temporarily in a sinter-tight manner with a first sintering closure and a second sintering closure, respectively.

In a fifth embodiment of the method of the invention, the sintering closures used to close the first and second wall openings in a sinter-tight manner are shaped so that after the sintering, the reinforcing body fills both wall openings at least in part.

In a sixth embodiment of the method of the invention, the sintering closures used to close the first and second wall openings in a sinter-tight manner are shaped so that after the sintering,
a first coil-core seat, starting from the first wall opening, is formed in the reinforcing body for the insertion of a first coil-core end section, starting from the first end face of the first coil core, and
a second coil-core seat, starting from the second wall opening, is formed in the reinforcing body for the insertion of a second coil-core end section, starting from the second end section of the second coil core.

In a seventh embodiment of the method of the invention, the sintering closures used to close the first and second wall openings in a sinter-tight manner each have a respective one of the coil cores temporarily inserted therein,
the first coil core being shaped and inserted in the first sintering closure in such a way that after the sintering, the first coil core fits the first coil-core seat, and that the first coil-core seat is in positive contact with at least part of the first coil-core end section, and
the second coil core being shaped and inserted in the second sintering closure in such a way that after the sintering, the second coil core fits the second coil-core seat, and that the second coil-core seat is in positive contact with at least part of the second coil-core end section.

In an eighth embodiment of the method of the invention, coil cores with end faces curved at least in sections are used.

A ninth embodiment of the method of the invention uses coil cores with end sections designed as a first pole piece and a second pole piece, respectively.

In a tenth embodiment of the method of the invention, coil cores with sintered end sections are used.

In an eleventh embodiment of the method of the invention, before the liquefied insulating material is introduced into the casting space, the first wall opening and the second wall opening are closed temporarily in a cast-tight manner with a first cap and a second cap, respectively, such that the insulating material fills both wall openings at least in part.

In a twelfth embodiment of the method of the invention, the caps used to close the first and second wall openings in a cast-tight manner are shaped so that after the solidification of the insulating material, the first and second coil-core seats for receiving the coil cores are formed in the liner.

In a thirteenth embodiment of the method of the invention, the caps used to close the first and second wall openings in a cast-tight manner each have a respective one of the coil cores temporarily inserted therein,
with the first coil core being shaped and inserted in the first cap in such a way that after the setting of the insulating material, the first coil core fits the first coil-core seat, and that the insulating material is in positive contact with at least part of the first coil-core end section, and
the second coil core being shaped and inserted in the second cap in such a way that after the setting of the insulating material, the second coil core fits the second coil-core seat, and that the insulating material is in positive contact with at least part of the second coil-core end section.

A fourteenth embodiment of the method of the invention comprises the steps of:
providing the first coil core with a cylindrical first coil and the second coil core with a cylindrical second coil prior to introducing the liquefied insulating material; and
using caps for closing the first and second wall openings in a cast-tight manner each having a respective one of the coil cores with a respective one of the coil cores temporarily fitted therein,
the first coil core with the first coil being shaped and fitted in the first cap in such a way that after the solidification of the insulating material, the first coil is embedded in the insulating material, and
the second coil core with the second coil being shaped and fitted in the second cap in such a way that after the solidification of the insulating material, the second coil is embedded in the insulating material.

A fifteenth embodiment of the method of the invention comprises the steps of:
providing the support tube with a third wall opening for the insertion of a first electrode and with a fourth wall opening for the insertion of a second electrode prior to inserting the first sintering mandrel; and
after the insertion of the first sintering mandrel, closing the third wall opening and the fourth wallopening temporarily in a sinter-tight manner with a third sintering closure and a fourth sintering closure, respectively.

In a sixteenth embodiment of the method of the invention, the sintering closures used to close the third and fourth wall openings in a sinter-tight manner are so shaped and dimensioned that during the sintering, both sintering closures extend into the lumen of the support tube.

In a seventeenth embodiment of the method of the invention, the sintering closures used to close the third and fourth wall openings in a sinter-tight manner are so shaped and dimensioned that during the sintering, each of the two sintering closures extends up to the first sintering mandrel.

In an eighteenth embodiment of the invention, before the liquefied insulating material is introduced, the third wall opening and the fourth wall opening are closed temporarily in a cast-tight manner with a third cap and a fourth cap, respectively, such that after having solidified, the insulating material fills the two wall openings at least in part.

In a ninteenth embodiment of the method of the invention, the caps used to close the third and fourth wall openings in a cast-tight manner each have a respective one of the electrodes temporarily fitted therein, with the first electrode being shaped and fitted in the third cap in such a way that after the setting of the insulating material, the first electrode is fitted in the liner, and that the insulating material is in positive contact with sections of the first electrode, and the second electrode being shaped and fitted in the fourth cap in such a way that after the setting of the insulating material, the second electrode is fitted in the liner, and that the insulating material is in positive contact with sections of the second electrode.

In a twentieth embodiment of the method of the invention, a support tube of high-grade steel is used.

In a twenty-first embodiment of the method of the invention, porous bronze is used as the first material to be sintered.

In a twenty-second embodiment of the method of the invention, polyfluorocarbon is used as the insulating material.

In a twenty-third embodiment of the method of the invention the insulating material is introduced and allowed to solidify using a transfer-molding, compression-molding, or injection-molding technique.

In a first embodiment of the flow sensor of the invention, the first coil-core seat and the second coil-core seat are in positive contact with at least sections of the first coil-core end section and the second coil-core end section, respectively.

In a second embodiment of the flow sensor of the invention, the first coil-core end section and the second coil-core end section are designed in the manner of pole pieces.

In a third embodiment of the flow sensor of the invention, the reinforcing body is a sintered part.

In a fourth embodiment of the flow sensor of the invention, the liner is a molding or an injection-molded part which is in positive contact with at least sections of the first and second coil cores.

In a fifth embodiment of the flow sensor of the invention, the first coil and the second coil are wound on the first coil core and the second coil core, respectively, and are at least partly embedded in the insulating material of the liner.

One basic idea of the invention is to produce the liner directly in the support tube, i.e., in situ, rather than inserting it into the support tube as a prefabricated component.

Another basic idea of the invention is, on the one hand, to design the end faces of the coil cores arbitrarily within wide limits, particularly as pole pieces, and thus optimize the magnetic field in the fluid, and, on the other hand, to provide the reinforcing body with coil-core seats whose respective shapes correspond with the shapes of the end faces.

One advantage of the invention is that the reinforcing body can be fitted tightly into virtually any arbitrarily shaped lumen of the support tube in a simple manner. Through the additional formation of end-side expanded portions in the support tube and the filling of these portions with material for the reinforcing body, the reinforcing body, and thus the liner, can be centered and fixed in the support tube in a simple manner.

Another advantage of the method is that the liner with the embedded reinforcing body is produced already in its final form and position, so that both can be given virtually any three-dimensional shape required, particularly also a shape surrounding other components. Therefore, accurately shaped seats for the coil cores and feedthrough holes for the electrodes can be formed in the liner already during the sintering of the reinforcing body and during the introduction and solidification of the insulating material, with the inner surfaces of the through holes being covered by the insulating material of the liner if necessary. If the coil cores, or the cores with coils wound thereon, are disposed on the support tube already before the insulating material is introduced, they, too, can be embedded, wholly or in part, in the insulating material during the formation of the liner.

By embedding ferromagnetic materials in the reinforcing body in those areas where the magnetic field is to be coupled into the interior of the measuring tube during operation of the flow sensor, the pole pieces are directly integrable into the liner. If two or more ferromagnetic materials of different permeabilities are used, the three-dimensional shape of the magnetic field produced during operation of the flow sensor can be influenced and thus optimized.

A further advantage of the method of the invention is that the liner with the reinforcing body can be designed for arbitrary nominal diameters in any thickness and length, and thus with any mechanical strength and dimensional stability required, practically without additional technical complexity. This is possible since the reinforcing body, if a single sintering operation does not suffice to achieve the required mechanical strength, can also be sintered repeatedly. The reinforcing body can also be composed of two or more sintered layers formed successively in situ.

The invention will now be explained in more detail with reference to the accompanying drawings, which show embodiments of the invention. Like parts are designated by like reference characters. If necessary for clarity, however, reference characters have been omitted in subsequent figures. In the drawings:

BRIEF DESCRIPTION OF THE DRAWINGS

FIG. 3b shows the introduction of material to be sintered into the support tube of FIG. 3a;

DETAILED DESCRIPTION OF THE PREFERRED EMBODIMENTS

Figure 1:
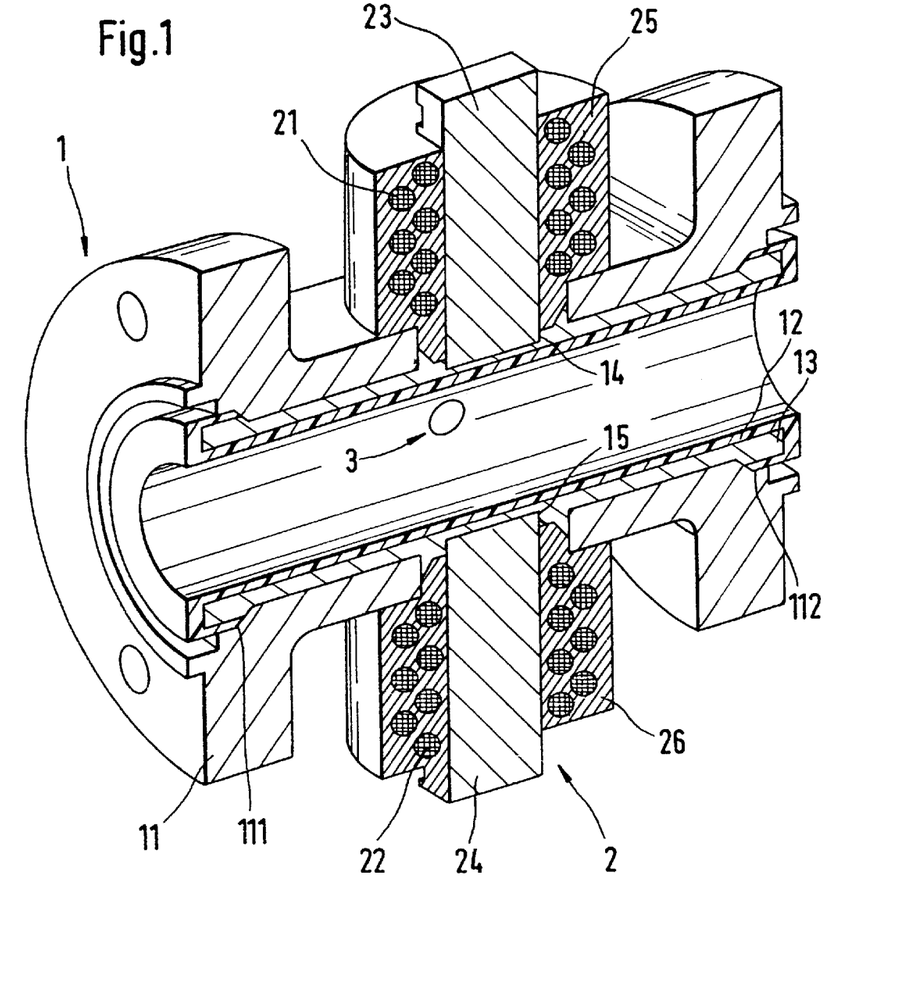
FIG. 1 shows a perspective longitudinal section of an electromagnetic flow sensor.
Figure 2:
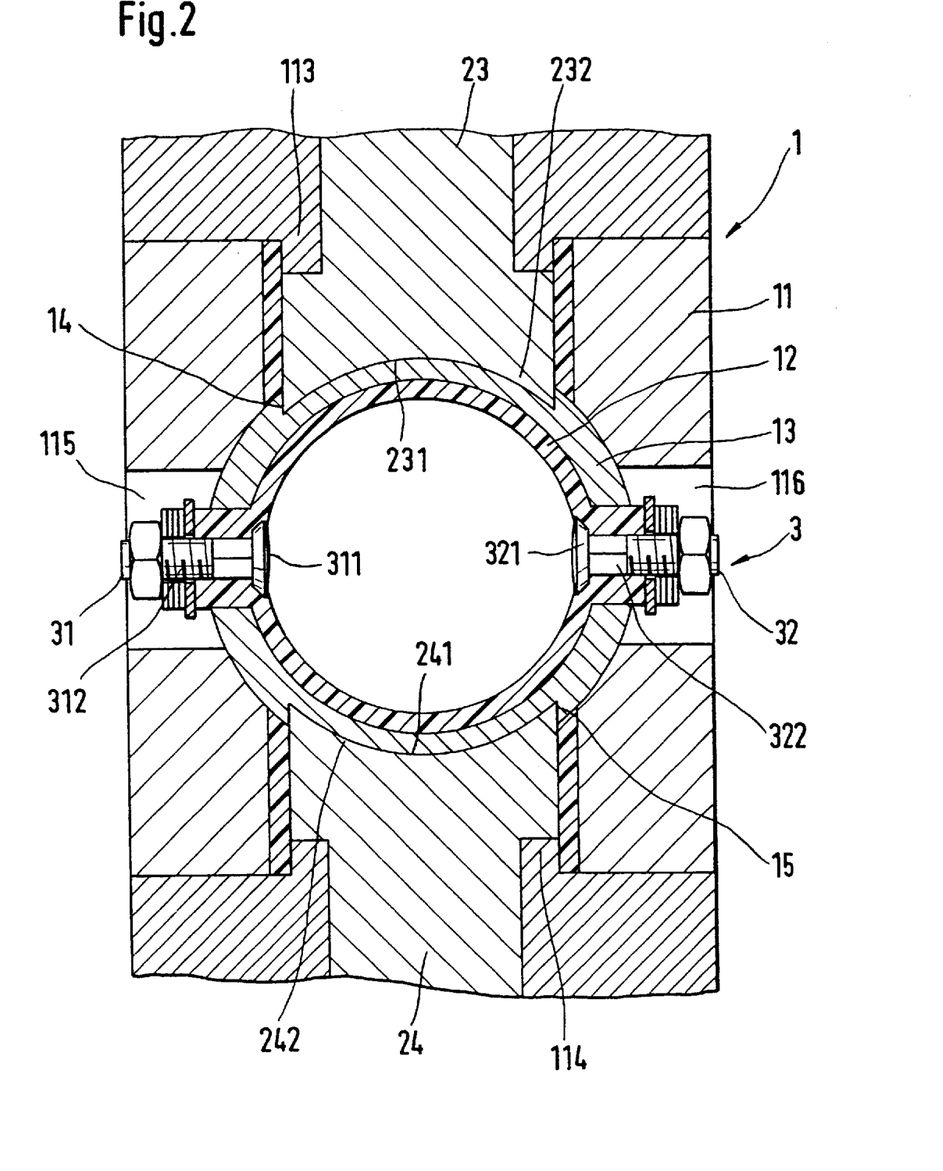
FIG. 2 shows a cross section of an essential portion of an electromagnetic flow sensor.

FIG. 1 shows a perspective longitudinal section of an electromagnetic flow sensor, and FIG. 2 shows an essential portion of the flow sensor in a schematic cross-sectional view. The flow sensor comprises a straight measuring tube 1 of predeterminable shape and size for conducting a flowing fluid, a magnetic-circuit arrangement 2 disposed on the measuring tube 1 for guiding a magnetic field through the fluid, and an electrode assembly 3, also disposed on the measuring tube 1, for measuring a voltage induced in the fluid.

For pressure-tight installation in a pipe for conducting a fluid, the measuring tube 1 has an inlet-side first end and an outlet-side second end.

The measuring tube 1 comprises a support tube 11 of a predeterminable lumen, a tubular liner 12 made of insulating material and having a predeterminable inside diameter, and an open-pore reinforcing body 13 of predeterminable pore size and thickness which is embedded in the liner 12. The tubular reinforcing body 13 serves to mechanically stabilize the liner 12, particularly at temperatures of the flowing fluid of −40° C. to 200° C. in a pressure range of 0 bar to 40 bars. The support tube 11 surrounds the liner 12 with the reinforcing body 13 embedded therein coaxially, thus serving as an outer, supporting covering of the measuringtube 1.

As shown in FIGS. 1 and 2, the inner surface of the support tube 11 or the reinforcing body 13 is completely covered by the liner 12, SO that solely the liner 12 is wetted by the fluid flowing through the measuring tube 1, see also U.S. Pat. No. 3,213,685.

FIGS. 3a to 3f are longitudinal sections showing the flow sensor during different steps of its fabrication.

Figure 3A:
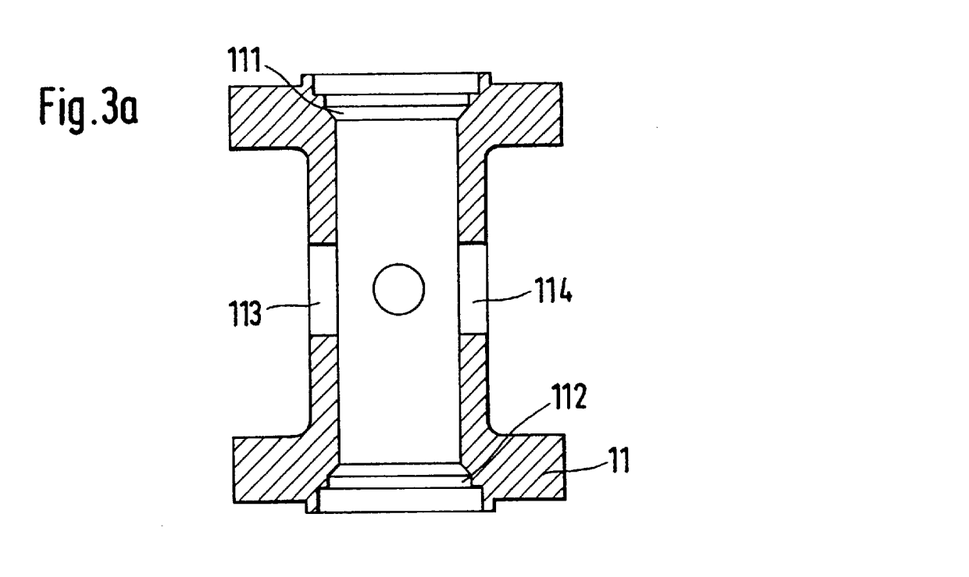
FIG. 3a shows a longitudinal section of a support tube with wall openings for the insertion of coil cores and electrodes.

FIG. 3a shows the support tube 11 at the beginning of the process of the invention. The support tube 11 is preferably formed as a low-cost casting which is subsequently finished by machining, such as milling, turning, and/or drilling; it can also be fabricated exclusively by machining or by other tube-manufacturing methods familiar to those skilled in the art. As materials for the support tube 11, all high-grade steels commonly employed in flow sensors, particularly alloyed and high-alloy steels, are used; it is also possible, to use other nonferromagnetic alloys, such as copper alloys, titanium alloys, or nickel alloys, but also suitable plastics, such as glass-fiber reinforced plastics.

The reinforcing body 13, as shown in FIG. 1, is a tubular body formed by sintering granular material of predeterminable particle size in situ, i.e., in its final form and position of installation in the support tube 11, such that it fits the tube and is securely fixed therein.

Figure 3B:
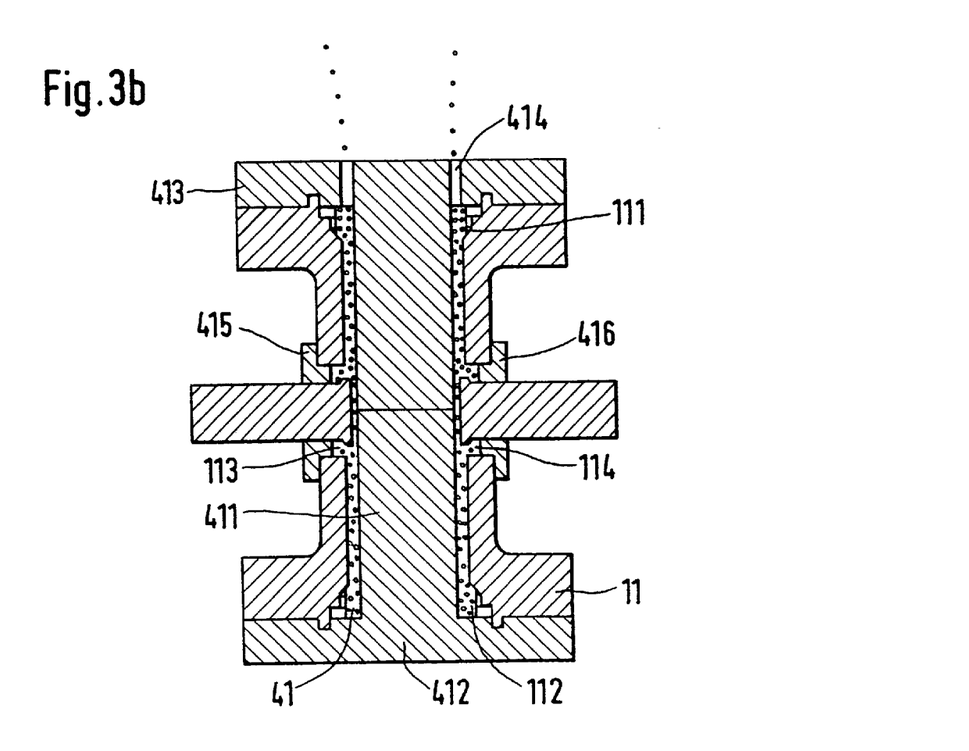

As shown in FIG. 3b, the sintering of the reinforcing body 13 is accomplished by inserting a first sintering mandrel 411 into the lumen of the support tube 11 and temporarily fixing it therein in such a way as to form a first sintering space 41 of a predeterminable first volume which is coaxial with the support tube 11. The sintering mandrel 411 consists of two partial mandrels which are so designed that after insertion into the support tube 11, their respective end faces abut; the sintering mandrel 411 can also be of a suitable one-piece construction, of course.

The sintering mandrel 411 is preferably symmetric about a longitudinal axis and has a smallest diameter greater than the predeterminable inside diameter of the liner 12 and a greatest diameter less than the greatest inside diameter of the support tube 11; if necessary, it can also be nonaxisymmetric, e.g., elliptic or prismatic.

If the reinforcing body 13 is conical or tapered from the inlet-side and outlet-side ends toward the inside of the measuring tube as is usual, for example, with small nominal diameters of 10 mm to 20 mm, the sintering mandrel 411 will consist of two partial mandrels which are conical or tapered correspondingly and which, after insertion into the support tube 11, butt on each other with their smaller end faces.

After the insertion of the sintering mandrel 411, the support tube 11 is closed in such a manner that only filling apertures remain for the material to be sintered. These filling apertures are preferably formed by a single end of the support tube 11 which is left open. An endside first flange 412 is commonly used to fix the sintering mandrel 411 in place and close the sintering space 41; if the sintering mandrel 411 is also fixed at its second end by means of an end-side second flange 413 as shown in FIG. 3b, one of the two flanges 412, 413 will preferably be provided with the corresponding filling apertures 414. It is self-evident and obvious that the particle size, the sintering volume, and the filling apertures have to be so dimensioned that the material to be sintered can be introduced into the sintering space 41.

After the sintering space 41 has been closed, it is filled with the material to be sintered, as shown schematically in FIG. 3b. The material is then sintered in the sintering space 41 to form the tightly fitting reinforcing body 13 in the lumen of the support tube 11, see FIG. 3c. If necessary, the support tube 11 is closed tightly prior to the sintering.

For the material to be sintered, metal particles, particularly porous-bronze particles, are used; it is also possible to use other materials, such as sintered-glass particles, sintered-ceramic particles, or sinterable, particularly surface-metallized, plastic particles.

If during operation of the flow sensor, for example due to different thermal expansion coefficients of reinforcing body 13 and support tube 11, mechanical stresses exceeding a maximum permissible value are to be expected, particularly within the reinforcing body 13, measures to reduce such stresses will be necessary.

Therefore, in one embodiment of the invention, the reinforcing body 13 consists of at least two tubular reinforcing bodies with different thermal expansion coefficients which are coaxial and in nonpositive contact with one another.

Figure 3C:
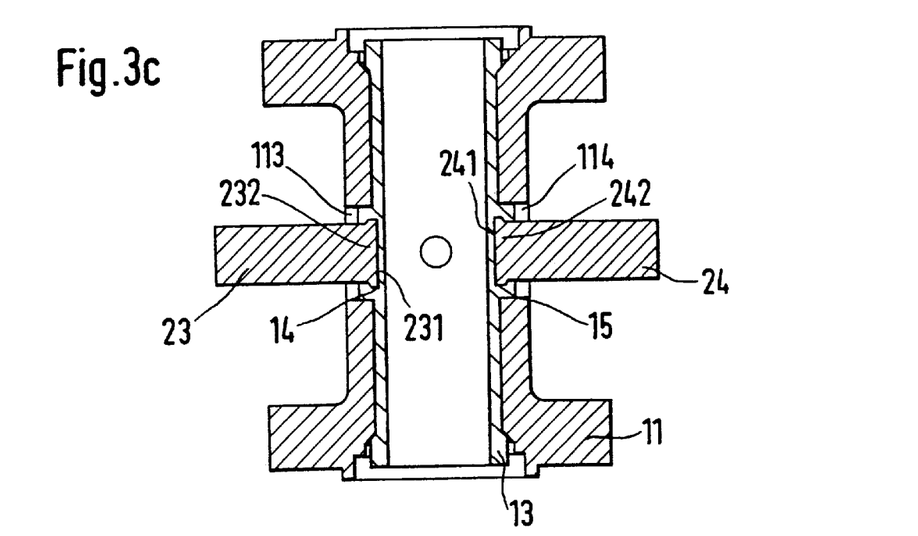
FIG. 3c shows the support tube of FIG. 3a with a reinforcing body and with coil cores sintered into the latter.
Figure 3D:
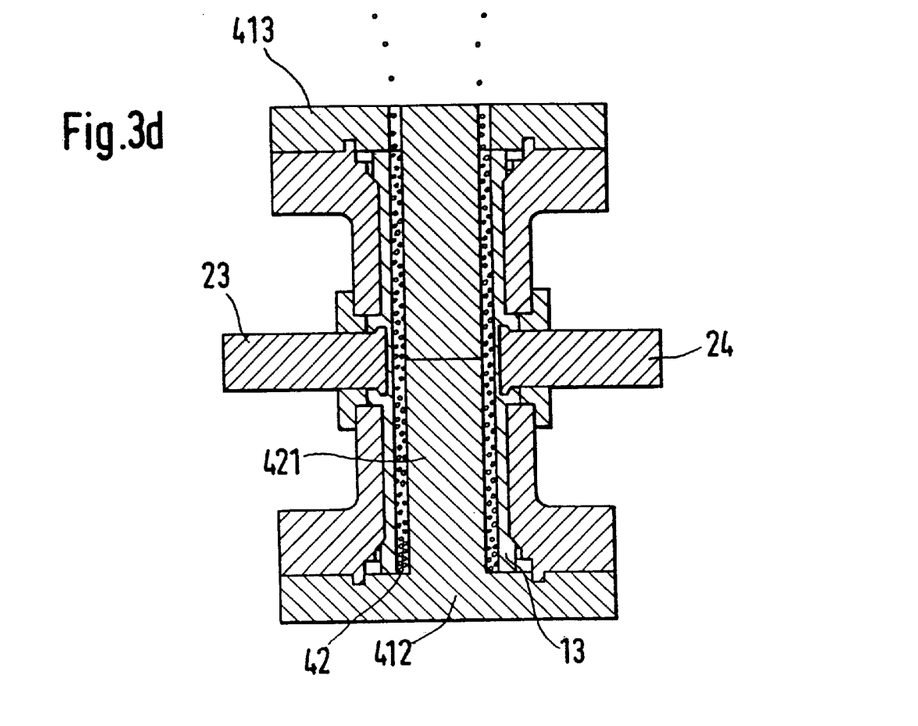
FIG. 3d shows the introduction of further material to be sintered into the support tube of 3c.

To produce the reinforcing body 13 consisting of at least two parts, in one embodiment of the method of the invention shown in FIG. 3d, the inserted first sintering mandrel 411 is replaced by a second sintering mandrel 421 which is temporarily fixed in the lumen of the support tube 11 in such a way as to form a second sintering space 42 of a predeterminable second volume between the sintering mandrel 421 and the already sintered reinforcing body 13, this second sintering space 42 being coaxial with the longitudinal axis of the lumen; if necessary, the sintering mandrel 421, like the sintering mandrel 411, can be of two-piece construction.

The sintering mandrel 421 has a smallest diameter greater than the smallest inside diameter of the liner 12, and a greatest diameter less than the greatest diameter of the sintering mandrel 411. After insertion of the sintering mandrel 421, as during the preceding sintering, the support tube 11 is closed in a sinter-tight manner, for example by means of the flanges 412, 413. Then, the sintering space 42 is filled with a second material to be sintered, whereupon the support tube 11 is closed tightly. After that, the second material is sintered in the sintering space 42 to form a strengthened reinforcing body 13 consisting of two coaxial parts.

This two-part or multipart construction of the reinforcing body 13 can also serve, for example, to optimize temperature distributions in the measuring tube 1 or to optimize the electromagnetic properties of the reinforcing body 13.

As shown in FIGS. 1 and 2, the inner surface of the measuring tube 1 is covered with a liner 12, such that during operation of the flow sensor, reinforcing body 13 and/or support tube 11 are perfectly isolated from the fluid flowing through the measuring tube.

Figure 3E:
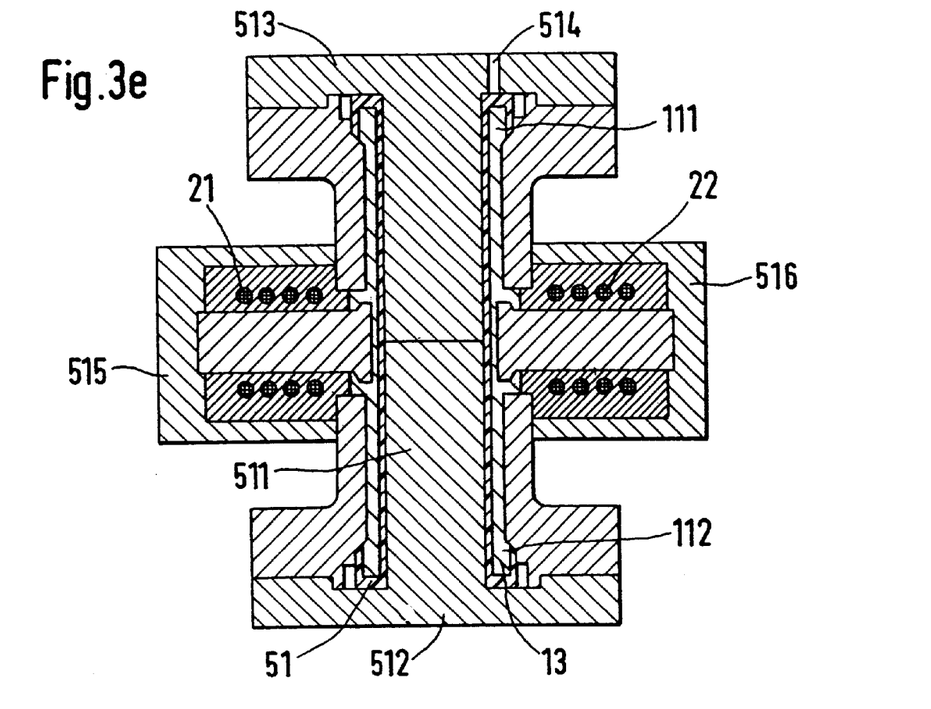
FIG. 3e shows the introduction of insulating material into the support tube of FIG. 3c.

As shown in FIG. 3e, the liner 12 is formed directly in the support tube 11 after the formation of the reinforcing body 13 by introducing liquefied insulating material and allowing the material to solidify. This is done using a conventional transfer-, compression-, or injection-molding technique.

For the insulating material, all those plastics commonly used for the liner 12 in electromangetic flow sensors can be used which can be liquefied at least once for introduction into the support tube 11, such as thermoplastics, patricularly fluorine-containing thermoplastics or polyolefins, or thermosetting plastics, particularly cast resins or polyurethanes.

To form the liner 12, the sintering mandrel 411 or 421 is replaced by a casting mandrel 511 which is temporarily fixed in the lumen of the support tube 11 in such a way as to form a casting space 51 of a predeterminable volume between the casting mandrel 511 and the reinforcing body 13, this casting space 51 being coaxial with the longitudinal axis of the lumen. The casting mandrel 511 is preferably cylindrical with a diameter not exceeding the predetermined inside diameter of the liner 12, taking into account a volume shrinkage after the solidification of the insulating material.

After the insertion of the first casting mandrel 511, the support tube 11 is closed in a cast-tight manner, leaving only apertures for introducing the liquefied insulating material. The fixing of the casting mandrel 511 and the closing of the support tube 11 are effected by means of third and fourth end-side flanges 512 and 513, respectively, one of which, for example, has a corresponding aperture 514 for introducing the insulating material.

After the closure of the support tube 11, liquefied insulating material is introduced into the casting space 51. It penetrates into the pores of the reinforcing body 13 and fills the latter.

The introduction of liquefied insulating material preferably continues until the casting space 51 and the reinforcing body 13 are filled up with the insulating material, but at least until the casting space 51 is filled up and the reinforcing body 13 is at least partly filled with the insulating material. Thus, after the insulating material has set, it completely covers the reinforcing body 13 at least on the inner side, i.e., on the side facing the fluid during operation of the flow sensor.

After being introduced, the insulating material is allowed to solidify, thus forming the liner 12 with the embedded reinforcing body 13 in the lumen of the support tube 11 in such a manner that the liner 12 isolates the reinforcing body 13 and the support tube 11 from the fluid.

The support tube 11 preferably has a first expanded portion at the inlet end and a second expanded portion 112 at the outlet end. As shown in FIGS. 1 and 3a, the two expanded portions 111, 112 are tapered in sections toward the inside; they can also have a straight cylindrical shape.

During sintering, both expanded portions 111, 112 are filled, at least in part, with material to be sintered, so that the sintered reinforcing body 13 and the support tube 11 are additionally secured in place, see FIG. 3c.

Figure 3F:
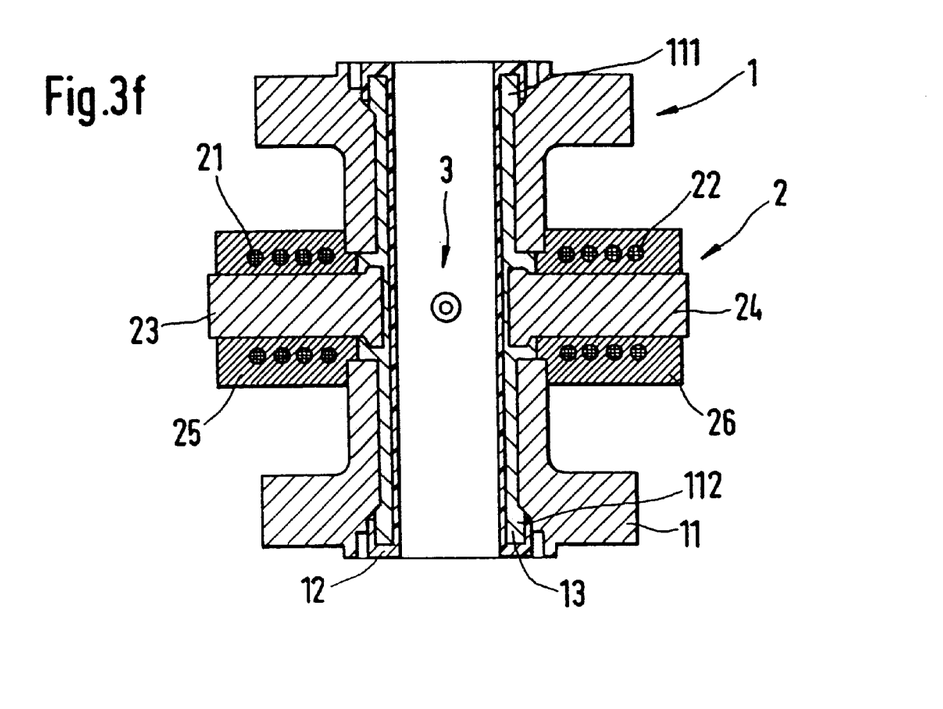
FIG. 3f shows a longitudinal section of an electromagnetic flow sensor.

Preferably, the expanded portions 111, 112 are filled with the reinforcing body 13 in such a way that the liner 12 surrounds part of the reinforcing body 13 in the areas of the expanded portions 111, 112, thus being virtually completely covered by the liner at its ends, see FIGS. 3e and 3f.

To optimally match the pore size to the insulating material of the liner 12 and reduce the volume shrinkage of the sintered reinforcing body 13 from the first and/or second sintered volumes, in a further embodiment of the method of the invention, suitable sinterable mixtures of different materials and/or of different particle sizes can be used.

To produce and guide a magnetic field passing through the fluid in sections, the flow sensor has a magnetic-circuit arrangement 2 as shown in FIGS. 1 and 2. The magnetic-circuit arrangement 2 comprises a first cylindrical coil 21 and a second cylindrical coil 22 which surround a first ferromagnetic coil core 23, having a free first end face 232 of predeterminable shape, and a second ferromagnetic coil core 24, having a free second end face 242 of predeterminable shape, respectively.

To suppress eddy currents, each of the coil cores is preferably made as a single formed sheet metal part or as a stack of mutually isolated formed sheet metal parts, see JP-Y 2-28 406 or U.S. Pat. No. 4,641,537.

Outside the measuring tube 1, the coil cores 23, 24 have their ends opposite their respective end faces 232, 242 connected to a likewise ferromagnetic yoke of predeterminable length and shape (not shown). The yoke is commonly placed around the measuring tube 1 from outside on both sides, see U.S. Pat. No. 4,641,537.

In another embodiment of the invention, the coil cores 23, 24, instead of being constituted by the formed sheet metal parts, are formed, at least at the ends, from sintered ferromagnetic material, particularly from surface-metallized plastic particles.

The coils 21 and 22 are preferably wound on tubular first and second coil forms 25 and 26, respectively, which coaxially surround the coil cores 23 and 24, respectively; they can also be air-core coils or be embedded, at least in part, in the respective coil forms 25, 26. Besides magnetic-circuit arrangements with two coils, arrangements with three or more coils are commonly used, see JP-A 3-21 414.

In operation, the coils 21, 22 are connected to excitation electronics for generating electric currents of predeterminable strength, and are traversed by these currents. This produces two magnetic fields which cut the respective end faces 231, 241 of the associated coil cores 23, 24 at essentially right angles and are superposed to form one resultant magnetic field. The latter passes through the fluid flowing within a measured volume in sections and at right angles to the direction of flow. For the excitation electronics, the circuit arrangements described in the prior art can be used.

The measuring tube 1 preferably comprises a first coil-core seat 14 for receiving one end of the coil core 23 and a second coil-core seat 15 for receiving one end of the coil core 24, see FIGS. 1 and 2.

The coil-core seats 14 and 15 preferably have a first surface and a second surface, respectively, which are in positive contact with the end faces 231 and 241 of the coil cores 23 and 24, respectively.

For the insertion of the coil cores 23, 24 into the coil-core seats 14, 15, the support tube 11 is provided with a lateral first wall opening 113 and a lateral second wall opening 114. The two wall openings 113, 114 preferably have the same shape and are located at a distance from each other along a circumference of the support tube 11, particularly diametrically opposite each other.

The coil cores 23, 24 are so inserted through the respective wall openings 113, 11 into the measuring tube 1 and so positioned relative to each other that their two end faces 231, 241 are located opposite each other, particularly diametrically opposite each other, along the circumference. The wall openings 113, 114 and the end faces 231, 241 may also be spaced along a chord of the circumference of the measuring tube 1 and/or be disposed in the measuring tube 1 nonsymmetrically, see JP-A 3-218 414.

For the insertion of the coil cores 23, 24, the wall openings 113, 114 must, of course, be dimensioned so that the coil cores 23, 24 will readily pass therethrough.

The wall openings 113, 114 are formed in the support tube 11 prior to the insertion of the first sintering mandrel 411 and are closed in a sinter-tight manner by means of a first sintering closure 415 and a second sintering closure 416, respectively, before the material for the reinforcing body 13 is introduced, see FIG. 3b.

The sintering closures 415, 416 are preferably so designed that the reinforcing body 13 fills the two wall openings 113, 114 at least in part, as shown in FIG. 3c. The filling of the wall openings 113, 114 is done in such a manner, for example, that the reinforcing body 13 rests laterally against the wall openings 113, 114 and is thus additionally secured in position.

If necessary, before the liquefied insulating material for the liner 12 is introduced, the two wall openings 113 and 114 are closed in a cast-tight manner with a first cap 515 and a second cap 516, respectively, as shown in FIG. 3e.

The three-dimensional shape of the magnetic field in the measured volume, and thus the accuracy of the flow sensor, is also determined by the distance between the end faces of the coil cores. The closer the end faces are to each other, the smaller the measured volume and the stronger the electric field with unchanged excitation, particularly in the region of the fluid with high flow velocity. The effect of disturbances in the fluid, which are due, for example, to changes in flow behavior or to temperature variations, on a measurement signal obtained with the flow sensor is reduced correspondingly. At the same time, the sensitivity of the flow sensor to changes in the volumetric flow rate to be measured increases. It is optimal if the two end faces are as close together as possible.

To increase the sensitivity of the flow sensor, the first and second coil-core seats 14, 15 are formed in the reinforcing body 13 with a predeterminable depth such that their surfaces are located opposite each other and are separated by a predeterminable distance. This permits first and second end sections 232 and 242 of the coil cores 23 and 24 to be fitted into the coil-core seats 14 and 15, respectively, so that the end faces 231, 241 of the coil cores 23, 24 can be positioned on the measuring tube 1 at a predeterminable distance from each other which is virtually independent of the chosen thickness of the reinforcing body 13.

The three-dimensional shape of the magnetic field in the fluid, and thus the sensitivity of the flow sensor, can also be optimized by a suitable choice of the shape of the end faces, particularly by a curved or domed shape. If as compact a measurement volume as possible is preferred, the end faces 231, 241 can be curved or rounded convexly toward the lumen of the measuring tube 1, the radius of curvature being less than half the inside diameter of the liner 12; otherwise the radius of curvature must be correspondingly greater.

To further increase the sensitivity of the flow sensor, the two end faces 231, 241 and the respective adjoining coil-core end sections 232, 242 are designed in the manner of pole pieces of predeterminable shape and surface area, as shown in FIG. 2. The end faces 231, 241 are then preferably of a domed or curved shape and have a uniform convex curvature toward the lumen of the measuring tube 1.

If coil-core seats 14, 15 of a form-fit design are formed in the reinforcing body 13, the two sintering closures 415, 416 have surfaces which are in contact with the material to be sintered and correspond to the shapes of the coil-cores and sections to be inserted, 232, 242. The same applies analogously to the caps 515, 516 and their surfaces which are in contact with the liquefied insulating material.

As the two sintering closures 415, 416 and/or the two caps 515, 516 are shaped in accordance with the coil cores 232, 242, fitting coil-core seats 14 and 15 can be formed in the reinforcing body 13 in a simple manner.

This shaping of the sintering closures 415, 416 and the caps 515, 516 can be implemented to advantage by temporarily inserting the coil cores 23 and 24 into the sintering closures 415 and 416, respectively, prior to the sintering, as shown in FIG. 3b, and into the caps 515 and 516, respectively, prior to the introduction in of the liquefied insulating material, cf. FIG. 3e. In this manner, the ends of the coil cores 23, 24 are fitted, particularly positively and nonpositively, in the reinforcing body 13 and the liner 12 after completion of the measuring tube 1.

Thus, arbitrarily shaped coil cores, particularly also coil cores with domed free end faces, are readily insertably into the reinforcing body 13 to virtually any depth. Since the coil cores 23, 24 are already positioned in the support tube 11 for the sintering, they can also be inserted into the support tube 11 from the lumen of the latter.

If the coil cores 23 and 24 are fitted temporarily in the caps 515 and 516, respectively, the coils 21 and 22 are preferably wound on the coil cores 23 and 24, respectively, before the insulating material is introduced. In that case, the caps 515, 516 have such a pot like shape that the insulating material leaks out of the support tube 11 through the reinforcing body 13 and the wall openings 113, 114, and that after the insulating material has set, the coils 21 and 22 are at least partly embedded therein, thus forming the coil forms 25 and 26, respectively, cf. FIG. 3f. If the pores of the reinforcing body 13 do not permit the wall openings 113, 114 to be filled fast enough, suitable channels have to be provided in the reinforcing body 13, preferably during the sintering.

If the coil cores 23, 24 are inserted later, the shape and size of the coil-core seats 14, 15 must be such that the respective associated coil cores 23, 24 can be readily fitted in.

To further stabilize the liner 12, additional shoulders and steps can be formed in the wall openings 113, 114 to provide support for the reinforcing body 13 and the liner 12.

To pick off a voltage induced in a fluid, the flow sensor is provided with a sensor system 3 mounted in the measuring tube 1 and comprising a first electrode 31 and a second electrode 32, as shown in FIGS. 1 and 2. The electrodes are preferably bar electrodes with a first electrode head 311 and a second electrode head 321, respectively, for picking off the induced voltage and with a first electrode shank 312 and a second electrode shank 322, respectively, for connecting the sensor system to evaluation electronics.

The electrodes 31, 32 can be galvanic electrodes, as shown in FIG. 2, or capacitive electrodes.

The support tube 11 is therefore provided with a lateral third wall opening 115 and a lateral fourth wall opening 116 for the insertion of the electrodes 31 and 32, respectively.

The wall openings 115 and 116 have a diameter greater than the greatest diameter of the electrode shanks 312 and 322, respectively. They preferably have the same shape and are preferably located diametrically opposite each other, in which case the diameter of the support tube 11 joining the wall openings 115, 116 is perpendicular to the diameter of the support tube 11 joining the wall openings 113, 114.

If necessary, particularly if more than two electrodes are used, the electrodes 31, 32 may, of course, be so positioned at a distance from each other on the measuring tube 1 that they are not diametrically opposite each other. That will be the case, for example, if additional electrodes for reference potentials or, if the measuring tube 1 is installed in a horizontal position, electrodes for monitoring a minimum level of the fluid in the measuring tube 1 are provided.

For the later installation of the bar electrodes 31 and 32 into the measuring tube 1, the wall openings 115 and 116 are closed in a sinter-tight manner after the insertion of the first sintering mandrel 411 by means of a third sintering mandrel (not shown) and a fourth sintering mandrel (not shown), respectively. The closing of the wall openings 115, 116 is preferably done in such a way that the third and fourth mandrels extend up to the sintering mandrels 411, so that after the sintering of the reinforcing body 13, the two wall openings 115, 116 continue through the reinforcing body 13, see FIG. 2. The third and fourth mandrels each have a smallest diameter which is at least slightly greater than a greatest diameter of the first and second electrode shanks, respectively.

If galvanic electrodes are used as is shown in FIG. 2, the wall openings 115 and 116 and their continuations in the reinforcing body for filling in the insulating material will preferably be closed with a third cap (not shown) and a fourth cap (not shown), respectively, such that after the setting of the insulating material, the measuring tube 1, starting from the respective wall openings 115 and 116, has a first electrode feedthrough hole and a second electrode feedthrough hole, respectively.

The cast-tight closing of the wall openings 115, 116 is preferably done in such a way that the inner sides of the electrode feedthrough holes are completely covered with insulating material of a predeterminable minimum thickness, thus providing insulated passageways for the subsequent insertion of electrodes already during the formation of the liner 12. Taking account of the volume shrinkage, the third and fourth caps must be designed in such a way that after the solidification of the insulating material, electrode feedthrough holes corresponding to the electrode shanks 312, 322 are formed in the measuring tube 1.

If capacitive electrodes are used, the caps can be implemented to advantage by fitting the electrodes 31, 32 into them in such a way that after the solidification of the insulating material, the electrodes are installed in the measuring tube 1 in their final position and are perfectly isolated by the insulating material of the liner 12 from the reinforcing body 13 and the support tube 11 and, in operation, from the fluid.

Within the electrode feedthrough holes, the electrode shanks 312, 322 preferably have a prismatic shape, particularly the shape of a rectangular parallelepiped, at least in sections, so that the electrodes 31, 32 can be easily mounted in the lumen of the measuring tube 1 without a countertool.

If more than two electrodes are used, the sinter-tight and cast-tight closing of the respective electrode openings will be done in analogous fashion with corresponding closures and caps prior to the sintering of the reinforcing body and prior to the introduction of the insulating material, respectively.

Since both the in-situ sintering and the introduction of the insulating material into the support tube 11 and the liner 12 are thermal processes for achieving recrystallization in the structure of only one of the components of the measuring tube at a time, namely of support tube 11, reinforcing body 13, or liner 12, because of the sequence of operations the softening point of the support tube 11 must be higher than that of the reinforcing body 13, whose softening point, in turn, must be higher than the melting temperature of the liner 12.

What is claimed is:

1. An electromagnetic flow sensor for a fluid flowing through a pipe, said sensor having a measuring tube for conducting the fluid, said measuring tube can be inserted into the pipe, and said measuring tube comprising:

a support tube as an outer covering of the measuring tube, a tubular liner of insulating material located in a lumen of the support tube, for conducting a flowing fluid isolated from the support tube, and a reinforcing body embedded in the liner for stabilizing the liner;

a magnetic-circuit arrangement disposed on the measuring tube for producing and guiding a magnetic field which induces an electric field in the flowing fluid, said magnetic circuit-arrangement comprising at least one coil, a ferromagnetic first coil core magnetically coupled to the at least one coil and having an end face curved at least in sections, and a ferromagnetic second coil core magnetically coupled to the at least one coil and having an end face curved at least in sections; and electrodes for picking up a voltage from the said electric field, said first coil core having an end section fitted in a first coil-core seat within the reinforcing body in such a manner that said end face of the first coil-core is in positive contact with a surface of the first coil-core seat, and said second coil core having an end section fitted in a second coil-core seat within the reinforcing body in such a manner that said end face of the second coil-core is in positive contact with a surface of the second coil-core seat.

2. The electromagnetic flow sensor as claimed in claim 1, wherein the first coil-core seat and the second coil-core seat are in positive contact with at least sections of the first coil-core end section and the second coil-core end section, respectively.

3. The electromagnetic flow sensor as claimed in claim 1, wherein the first coil-core end section and the second coil-core end section are designed in a manner of pole pieces.

4. The electromagnetic flow sensor as claimed in claim 1, wherein the reinforcing body is a sintered part.

5. The electromagnetic flow sensor as claimed in claim 1, wherein the liner is a molding or an injection-molded part which is in positive contact with at least sections of the first and second coil cores.

6. The electromagnetic flow sensor as claimed in claim 5, wherein the first coil and the second coil are wound on the first coil core and the second coil core, respectively, and are at least partly embedded in the insulating material of the liner.

7. An electromagnetic flow sensor for a fluid flowing through a pipe, said sensor comprising:

a measuring tube which can be inserted into a pipe and has an inlet-side first end and an outlet-side second end, a magnetic-circuit arrangement disposed on the measuring tube for producing and guiding a magnetic field which induces an electric field in the flowing fluid, and a first electrode and a second electrode for picking up a voltage from the electric field, wherein the measuring tube comprises a support tube as an outer covering of the measuring tube, a tubular lining of insulating material, located in a lumen of the support tube, and an open-pore reinforcing body for stabilizing the liner, said reinforcing body being sintered directly in said support tube.

8. The flow sensor as claim in claim 7, wherein the support tube is a nonferromagnetic part.

9. The flow sensor as claimed in claim 7, wherein the liner is a transfer-molded part.

10. The flow sensor as claimed in claim 7, wherein the liner is a compression-molded part.

11. The flow sensor as claimed in claim 7, wherein the liner is an injection-molded part.

12. The flow sensor as claimed in claim 7, wherein the magnetic-circuit arrangement comprises:

at least a first coil, a ferromagnetic first coil core magnetically coupled to the at least first coil and having a first end face curved at least in sections, the first coil core having a first end section inserted through a first wall opening of the support tube and fitted in a first coil-core seat of the reinforcing body in such a manner that the first end face is in positive contact with a first surface of the coil-core seat, a ferromagnetic second coil core magnetically coupled to the at least first coil and having a second end face curved at least in sections, and the second coil core having a second end section inserted through a second wall opening of the support tube and fitted in a second coil-core seat of the reinforcing body in such a manner that the second end face is in positive contact with a second surface of the coil-core seat.

13. The flow sensor as claimed in claim 12, wherein the magnetic-circuit arrangement further comprises a second coil magnetically coupled to the coil cores.

* * * * *